(12) United States Patent
Masuo et al.

(10) Patent No.: US 8,930,614 B2
(45) Date of Patent: Jan. 6, 2015

(54) DATA STORAGE APPARATUS AND METHOD FOR COMPACTION PROCESSING

(75) Inventors: Yoko Masuo, Iruma (JP); Yoshimasa Aoyama, Kawasaki (JP); Hironobu Miyamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 13/560,486

(22) Filed: Jul. 27, 2012

(65) Prior Publication Data

US 2013/0198438 A1 Aug. 1, 2013

(30) Foreign Application Priority Data

Jul. 29, 2011 (JP) ................................. 2011-167041
Mar. 22, 2012 (JP) ................................. 2012-066239

(51) Int. Cl.
*G06F 12/02* (2006.01)
(52) U.S. Cl.
CPC .... *G06F 12/0246* (2013.01); *G06F 2212/7205* (2013.01)
USPC ...................................... 711/103; 365/185.33
(58) Field of Classification Search
CPC ................... G06F 12/0246; G06F 2212/7205; G06F 2212/7202; G06F 2212/1016; G06F 2212/7201; G06F 2212/7208; G06F 12/02; G06F 3/064; G06F 3/0679; G06F 2212/7203; G06F 11/1008; G06F 2212/2022; G06F 12/0238; G06F 2212/1036
USPC ...................................... 711/103; 365/185.33
See application file for complete search history.

(56) References Cited

U.S. PATENT DOCUMENTS

| 8,307,148 | B2 * | 11/2012 | Rogers et al. .................. 711/103 |
| 2008/0307192 | A1 * | 12/2008 | Sinclair et al. ................ 711/218 |
| 2010/0037012 | A1 * | 2/2010 | Yano et al. ..................... 711/103 |
| 2011/0022778 | A1 * | 1/2011 | Schibilla et al. .............. 711/103 |
| 2012/0254574 | A1 * | 10/2012 | Sinclair et al. ................ 711/165 |

FOREIGN PATENT DOCUMENTS

| JP | 64-48150 | 2/1989 |
| JP | 6-131249 | 5/1994 |
| JP | 8-235880 A | 9/1996 |
| JP | 2006-48237 | 2/2006 |
| JP | 2006-172494 | 6/2006 |
| JP | 2009-211219 | 9/2009 |
| JP | 2010-182216 | 8/2010 |
| JP | 2011-519095 A | 6/2011 |
| JP | 2011-192260 | 9/2011 |

OTHER PUBLICATIONS

Japanese Office Action issued Apr. 15, 2014 in Patent Application No. 2011-167041 with English Translation.

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

According to one embodiment, a data storage apparatus includes a flash memory and a controller. The controller includes a compaction processor. The compaction processor performs the compaction processing on the flash memory, to dynamically set a range of compaction processing targets based on a number of available blocks and an amount of valid data in each of the blocks, and to search the range of compaction processing targets for blocks each with a relatively small amount of valid data as the target blocks for the compaction processing.

15 Claims, 10 Drawing Sheets

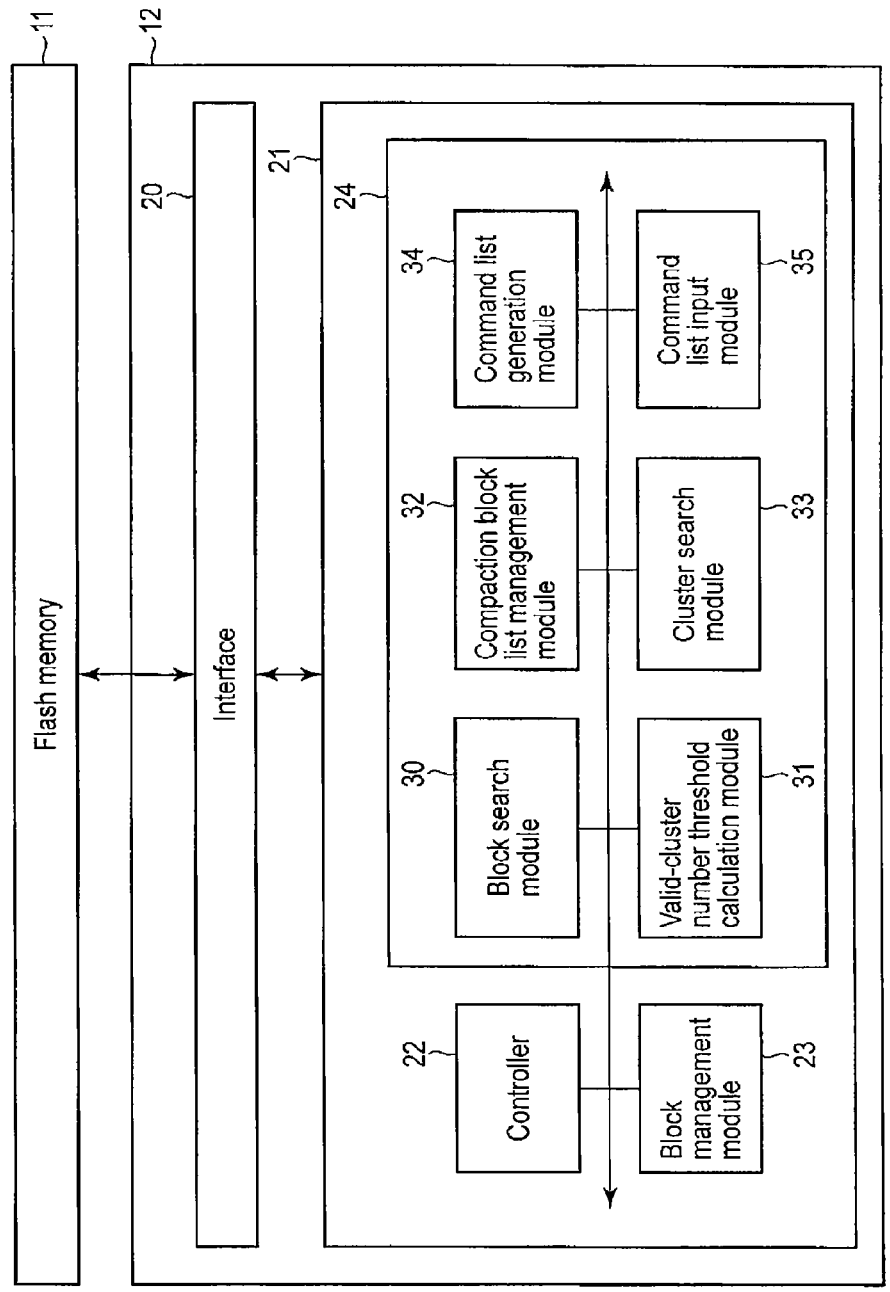
F I G. 2

| Margin (%) | Valid cluster density (%) | |
|---|---|---|
| 1 | -- | ~31 |
| 2 | 80 | |
| 3 | 70 | |
| 4 | 60 | |
| 5~9 | 50 | |
| 10~14 | 35 | |
| 15~19 | 25 | |
| 20~ | 20 | |
1000
F I G. 3
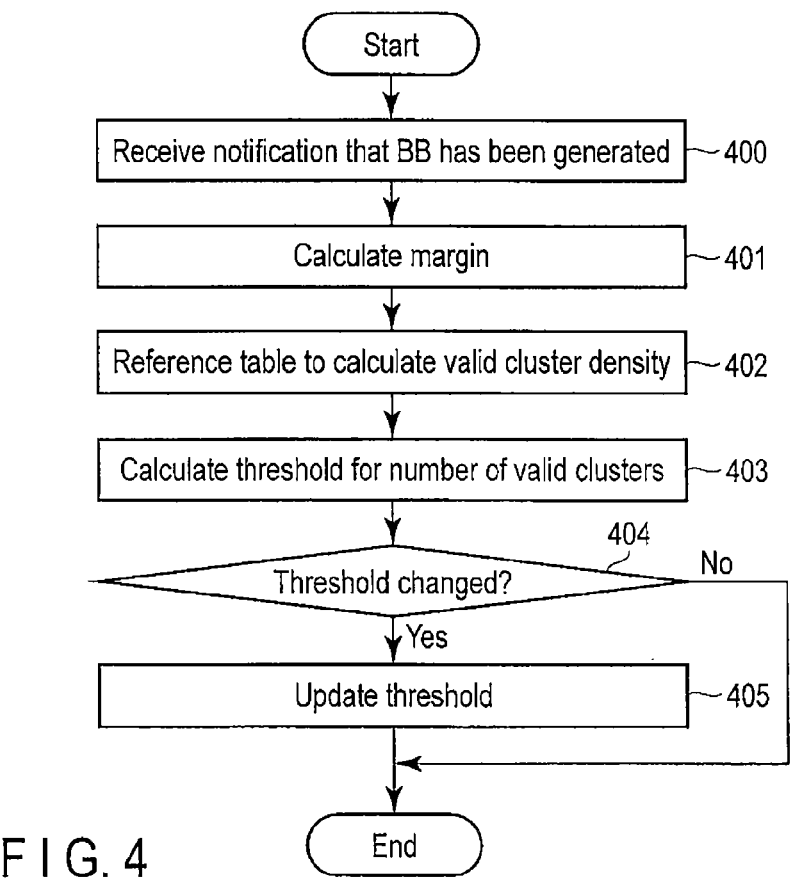
F I G. 4

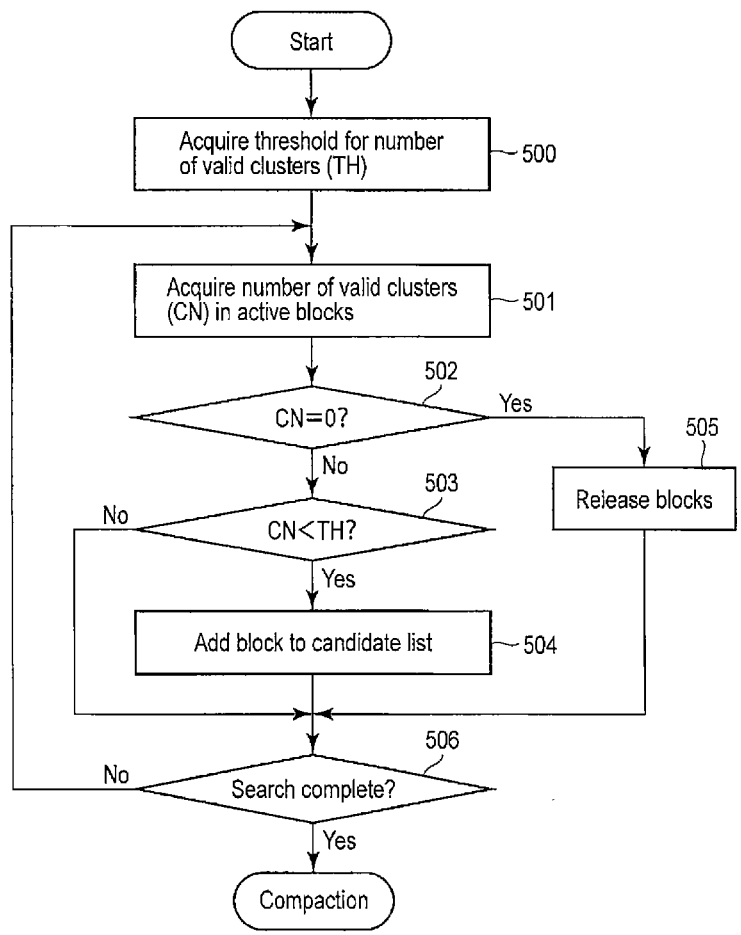
F I G. 5

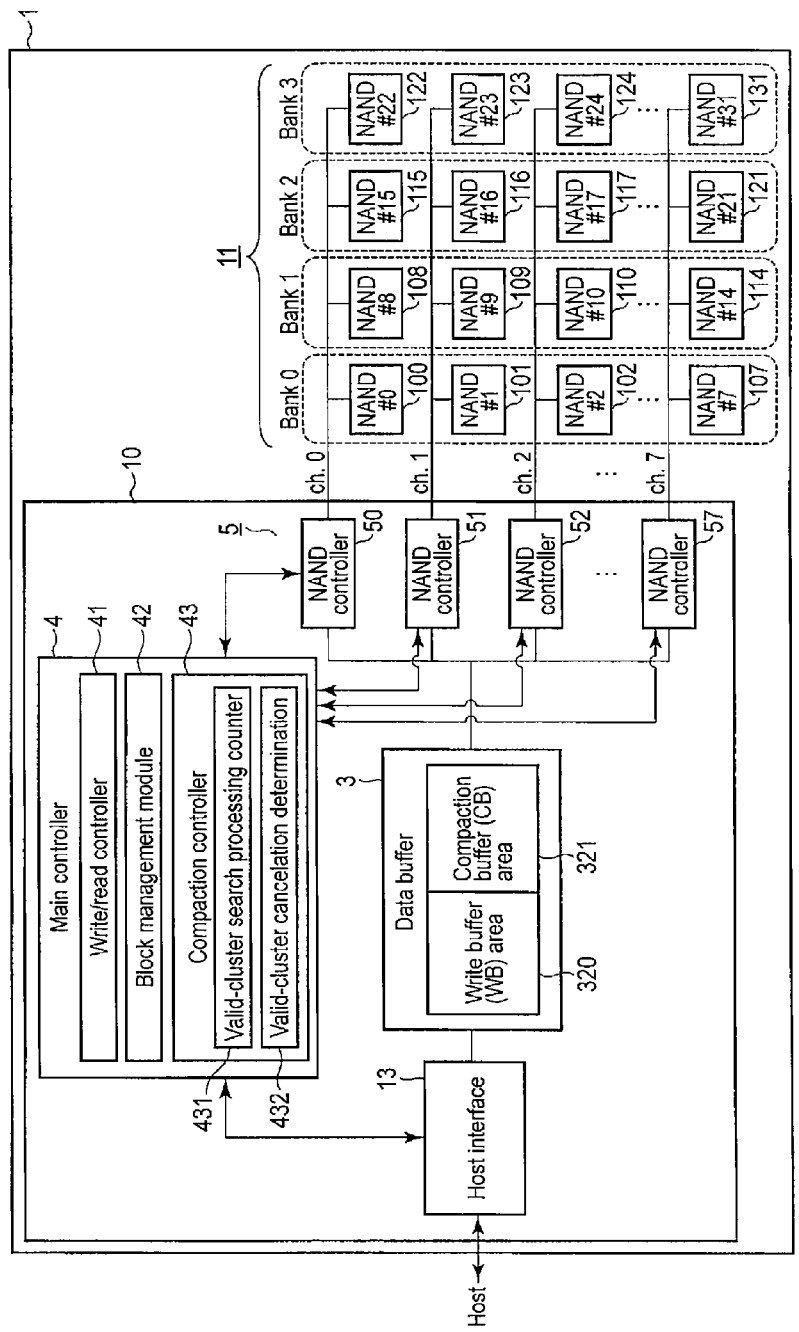
F I G. 7

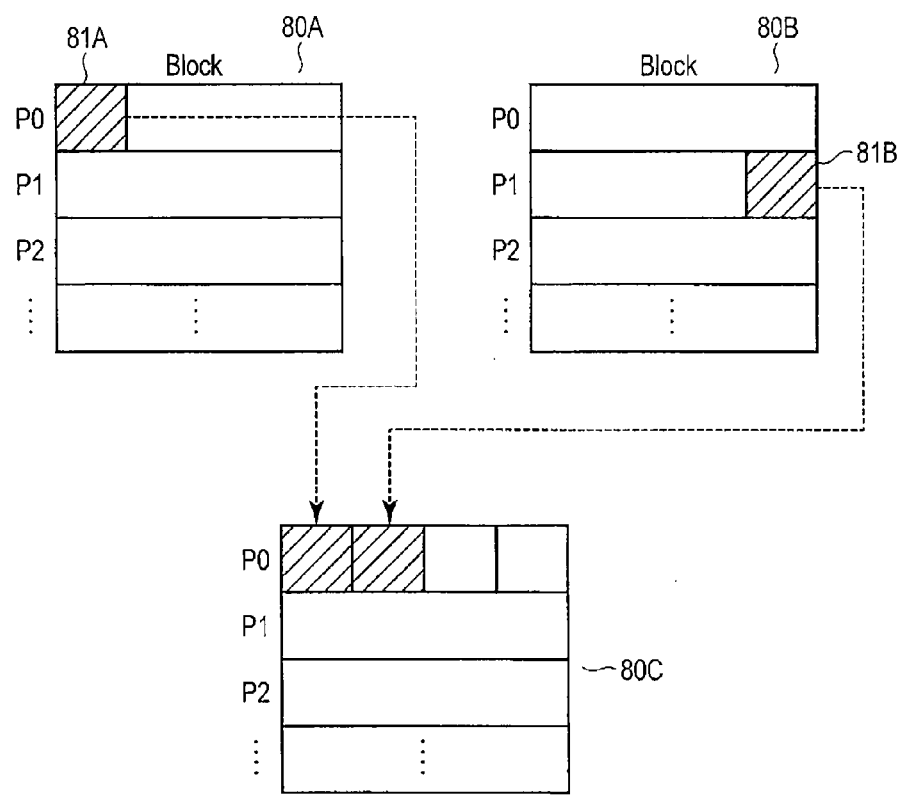
F I G. 8

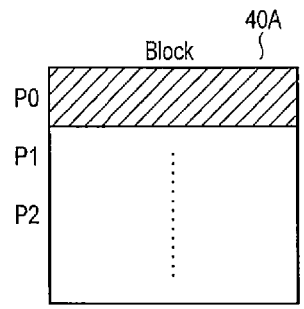
F I G. 10A
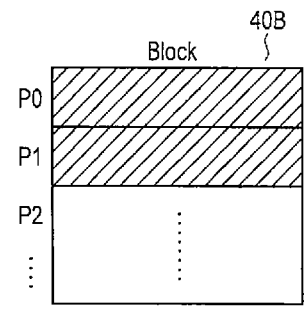
F I G. 10B
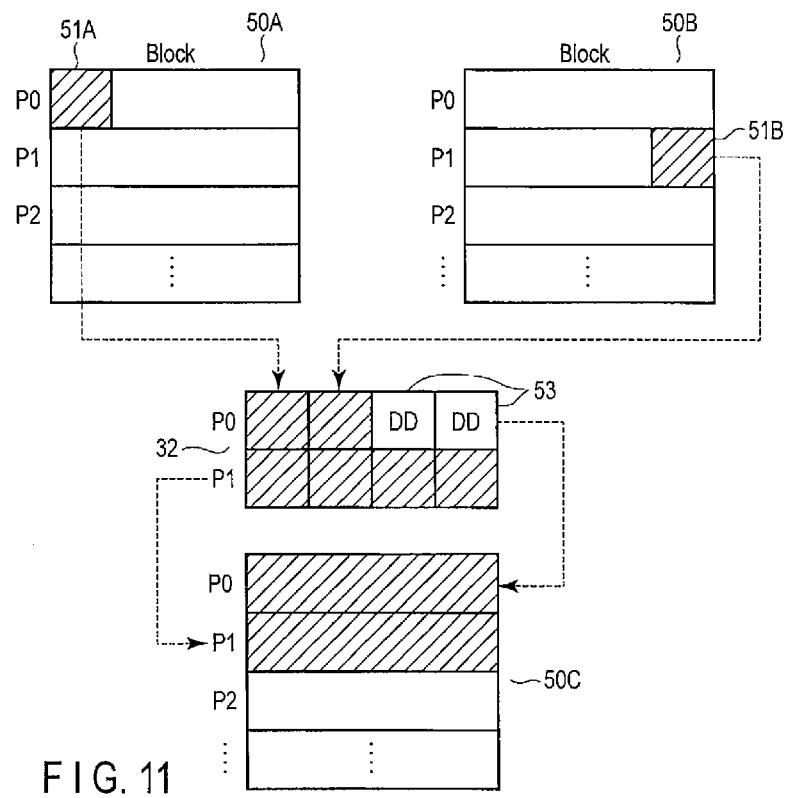
F I G. 11

DATA STORAGE APPARATUS AND METHOD FOR COMPACTION PROCESSING

CROSS-REFERENCE TO RELATED APPLICATIONS

This application is based upon and claims the benefit of priority from prior Japanese Patent Applications No. 2011-167041, filed Jul. 29, 2011; and No. 2012-066239, filed Mar. 22, 2012, the entire contents of all of which are incorporated herein by reference.

FIELD

Embodiments described herein relate generally to a data storage apparatus that uses a nonvolatile memory, a memory control apparatus, and a method of controlling a memory.

BACKGROUND

In recent years, development of solid-state drives (SSDs) has been seen great progress, such SSDs using NAND flash memories (hereinafter sometimes simply referred to as flash memories) as rewritable nonvolatile memories.

In a flash memory, data is written in units of pages, whereas data is erased in units of blocks. Furthermore, before rewriting, data erase processing needs to be performed on a storage area to be rewritten.

With this property of the flash memory, as the data in the flash memory is progressively rewritten, invalid data (which is not the latest data) serves to increase the rate of storage areas in each block in which valid data cannot be stored. Thus, the SSD performs compaction processing in order to effectively utilize the storage areas in each block.

The compaction processing collects valid data from blocks in which storage areas with valid data stored therein have a reduced density, and rewrites the data to another block. The compaction target blocks are recovered as effectively available storage areas by erase processing performed after the rewrite processing.

For the compaction processing, it is important to increase the efficiency of search processing of searching for compaction source blocks and valid data in the blocks (for example, in units of clusters). Time required for the search processing significantly affects the performance of the SSD, thus requiring a technique for reducing the time required for the search processing. A reduction in the time required for the search processing enables an increase in the efficiency of the compaction processing.

BRIEF DESCRIPTION OF THE DRAWINGS

FIG. 2 is a block diagram illustrating a configuration of a flash memory controller according to the first embodiment;

FIG. 3 is a diagram illustrating a valid-cluster number threshold table according to the first embodiment;

FIG. 4 is a flowchart illustrating processing of calculating a threshold for the number of valid clusters according to the first embodiment;

FIG. 5 is a flowchart illustrating processing of searching for compaction target blocks according to the first embodiment;

FIG. 7 is a block diagram illustrating a configuration of an SSD according to a second embodiment;

FIG. 8 is a diagram illustrating a summary of compaction processing according to the second embodiment;

FIGS. 10A and 10B are diagrams illustrating the progress rate of the compaction processing according to the second embodiment;

FIG. 11 is a diagram illustrating the compaction processing according to the second embodiment.

DETAILED DESCRIPTION

In general, according to one embodiment, a data storage apparatus includes a flash memory configured to erase data in units of blocks and a controller configured to control the flash memory. The controller includes a compaction processor configured to perform compaction processing, on the flash memory. The compaction processor is configured to perform the compaction processing on the flash memory, to dynamically set a range of compaction processing targets based on a number of available blocks and an amount of valid data in each of the blocks, and to search the range of compaction processing targets for blocks each with a relatively small amount of valid data as the target blocks for the compaction processing.

Various embodiments will be described hereinafter with reference to the accompanying drawings.

First Embodiment

Figure 1:
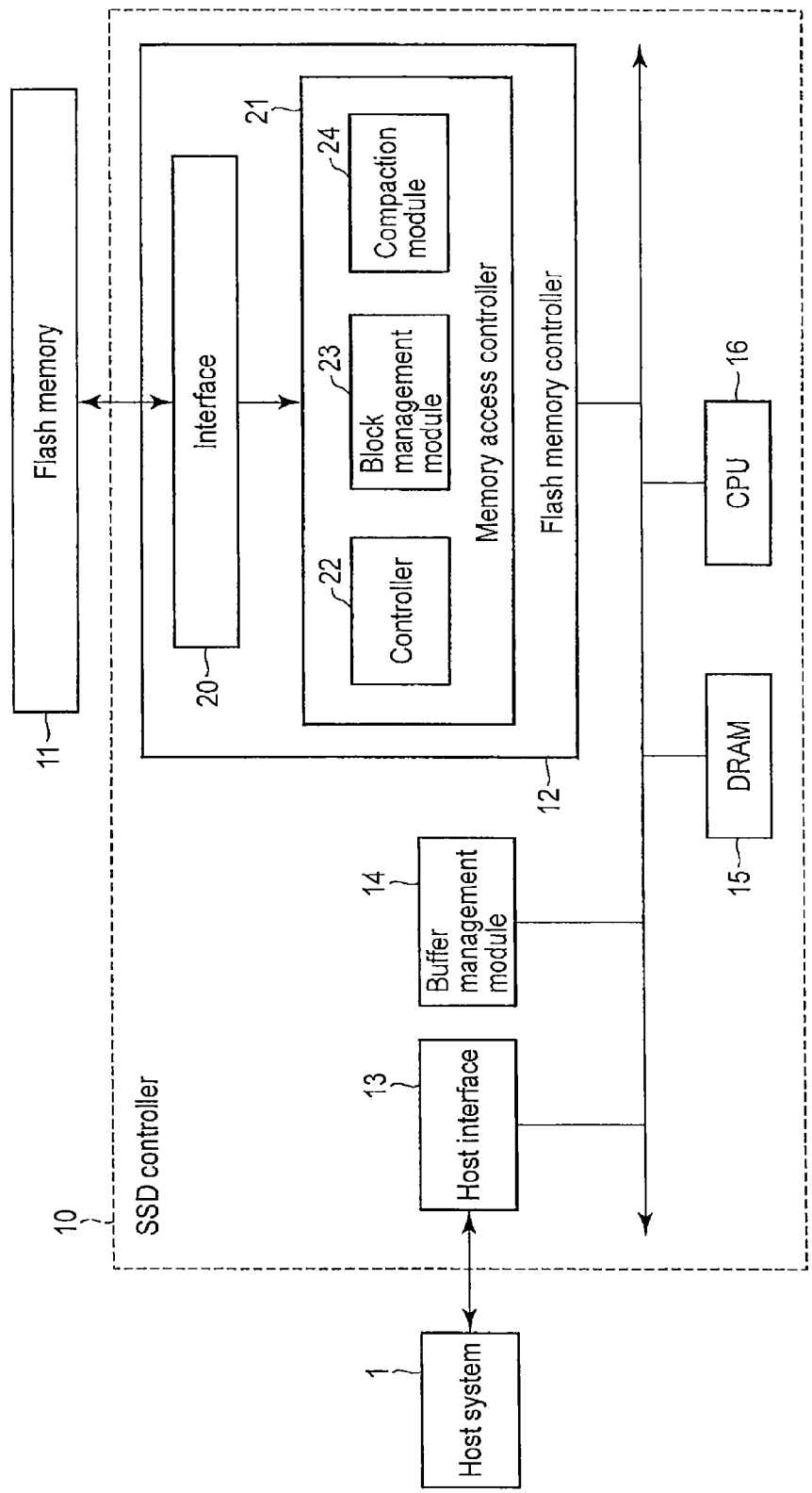
FIG. 1 is a block diagram illustrating a configuration of an SSD according to a first embodiment.

FIG. 1 is a block diagram showing a configuration of a data storage apparatus according to the present embodiment.

As shown in FIG. 1, the data storage apparatus is a solid-state drive (SSD) including a controller 10 and a NAND flash memory (hereinafter referred to as a flash memory) formed of a nonvolatile memory. The flash memory 11 is a data storage medium for the SSD and can be externally connected to the SSD for each channel or for each package.

The SSD controller 10 includes a flash memory controller 12, a host interface 13, a buffer management module 14, a buffer memory (DRAM) 15, and a microprocessor (CPU) 16. CPU 16 controls the whole SSD controller 10. DRAM 15 operates as a buffer memory to hold a logical/physical address conversion table and data transferred by the host system 1.

The host interface 13 controls the transfer of data, commands, and addresses between the host system 1 and the SSD controller 10. The host system 1 is, for example, a computer including a Serial ATA (SATA) conformant interface. The buffer management module 14 controls the buffer memory (DRAM) 15 to control the transfer of data between the host interface 13 and the buffer memory 15. Furthermore, the buffer management module 14 controls the transfer of data between the flash memory controller 12 and the buffer memory 15.

The flash memory controller 12 includes an I/O interface (simply referred to as an interface) 20 and a memory access controller 21. The interface 20 mediates data inputs and outputs between the flash memory 11 and the memory access controller 21 and data inputs and outputs between the flash memory 11 and a compaction module 24. The memory access controller 21 controls operations of writing and reading data to and from the flash memory 11 via the interface.

The memory access controller 21 includes a controller 22, a block management module 23, and the compaction module 24. The controller 22 controls the operation of modules such as the block management module 23 and the compaction module 24 which are connected to the controller via an internal bus. The block management module 23 has management information for use in managing free blocks (unused standby blocks) and the like, and manages the blocks in the flash memory 11.

(Compaction Module)

As shown in FIG. 2, the compaction module 24 comprises a block search module 30, a valid-cluster number threshold calculation module (hereinafter sometimes simply referred to as a threshold calculation module) 31, a compaction block list management module (hereinafter sometimes simply referred to as a block list management module) 32, a cluster search module 33, a command list generation module 34, and a command list input module 35.

The block search module 30 searches an active block group in which valid data is recorded, for candidates for compaction target blocks. The threshold calculation module 31 calculates a threshold for the number of valid clusters (hereinafter referred to as a valid-cluster number threshold) which is utilized as a condition for a block search processing performed by the block search module 30. The block list management module 32 manages the candidates for compaction target blocks and blocks being subjected to the compaction processing using the respective list structures.

The cluster search module 33 checks the list managed by the block list management module 32 to determine whether each block being subjected to the compaction processing comprises valid or invalid data in units of clusters; the clusters are minimum readable units. The cluster search module 33 searches for valid clusters that are valid data in units of clusters.

The command list generation module 34 generates a set of request commands for the compaction processing (compaction request commands) for valid clusters retrieved by the cluster search module 33. The command list input module 35 inputs the compaction request command received from the command list generation module 34 to the interface 20. Thus, the compaction processing is performed on the flash memory 11.

[Compaction Processing]

The compaction processing according to the present embodiment will be described below with reference to flowcharts in FIG. 3 and FIG. 4 to FIG. 6.

Figure 6:
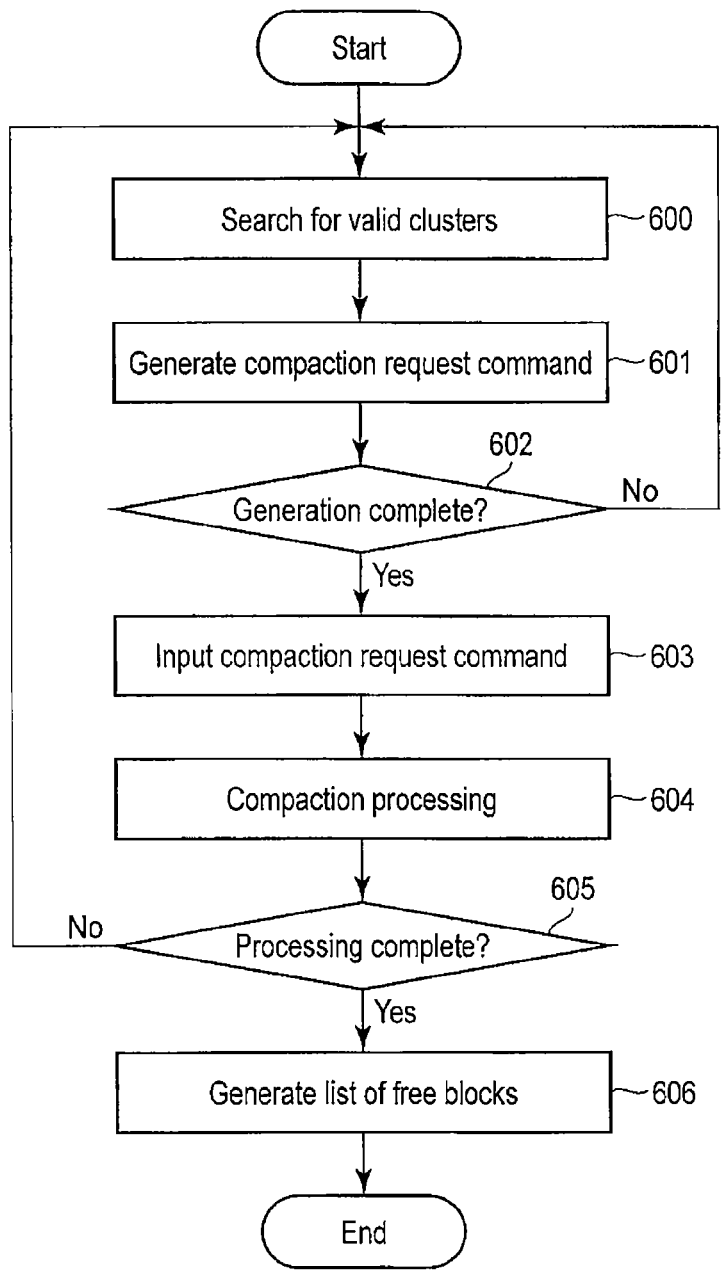
FIG. 6 is a flowchart illustrating compaction processing according to the first embodiment.

The SSD performs the compaction processing in order to effectively utilize storage areas in each block (see FIG. 6). As shown in FIG. 2, in the compaction module according to the present embodiment, the modules 30 to 35 cooperate with one another in quickly and efficiently carrying out the compaction processing (i.e., data transfer processing, rewrite processing, move processing, bunch up processing, or arrangement processing).

First, as shown in the flowchart in FIG. 5, the block search module 30 searches an active block group in which valid data is recorded for candidates for compaction target blocks. In this case, low-density blocks with as few valid clusters as possible need to be searched for as compaction target blocks in order to effectively achieve the compaction processing.

Here, the clusters are minimum access units for reading data from the flash memory 11. One cluster has an amount of data corresponding to a half of one physical page. In an SSD of a multichannel configuration, a logical page comprises physical pages the number of which is equal to the number of channels multiplied by the number of planes. Thus, valid clusters are valid data in units of clusters. Furthermore, the number of valid clusters (CN) is the amount of valid data in one block.

The block search module 30 uses a threshold (valid-cluster number threshold TH) for the number of valid clusters (CN) as a condition for search for compaction target blocks as described below. The valid-cluster number threshold TH is calculated by the threshold calculation module 31. Processing performed by the threshold calculation module 31 will be described with reference to the flowchart in FIG. 4.

As shown in FIG. 3, the threshold calculation module 31 comprises a management table 1000 for management of the valid-cluster number threshold. In the management table 1000, the margin (M) of storage capacity of the flash memory 11 is associated with the valid cluster density (CD) of the flash memory 11. The margin (M) is the rate of an actually usable storage capacity in an indicated apparatus capacity.

The threshold calculation module 31 receives a notification indicating that a disabled block (bad block [BB]) is generated, from the block management module 23 at the timing of the generation (block 400). Upon receiving the notification of generation, the threshold calculation module 31 calculates (recalculates) the margin (M) of the storage capacity (block 401). Here, the margin (M) is given by M=MC÷TC×100(%), where MC denotes the marginal capacity that is the total storage capacity available for storage of user data minus TC, and TC denotes the apparatus indicated capacity of the flash memory 11.

Moreover, the threshold calculation module 31 references the management table 1000 to calculate the valid-cluster density (CD) corresponding to the calculated margin (M) (block 402). Here, one cluster is the amount of data corresponding to, for example, a half of one page (physical page). Furthermore, one logical page comprises, for example, 32 physical pages, and one block is the amount of data corresponding to, for example, 64 physical pages. Based on these relations, information indicative of the margin (M) and the valid-cluster density (CD) in association with each other is pre-created into the management table 1000.

Then, the threshold calculation module 31 calculates the valid-cluster number threshold (TH) from the valid-cluster density (CD) calculated from the management table 1000 (block 403). The valid-cluster number threshold (TH) is given by TH=TN×CD, where TN denotes the total number of clusters in a logical block. The threshold calculation module 31 stores the calculated valid-cluster number threshold (TH) in the internal memory.

The threshold calculation module 31 compares the last valid-cluster number threshold (TH) stored in the internal memory with the calculated current time (block 404). If the threshold is changed, the threshold calculation module 31 updates the existing value in the internal memory to the current value of the valid-cluster number threshold (TH) (latest value) (block 405).

In short, based on the management table 100, the threshold calculation module 31 determines the corresponding valid-cluster density (CD) according to a variation in the margin of the flash memory 11 to calculate the latest valid-cluster number threshold (TH) based on the valid-cluster density (CD). The threshold calculation module 31 updates the existing value in the internal memory to the latest valid-cluster number threshold (TH). The threshold calculation module 31 may calculate the average number of valid clusters in the active block group, calculate the latest valid-cluster number threshold (TH) based on the average value, and stores the valid-cluster number threshold (TH) in the internal memory.

Then, as shown in the flowchart in FIG. 5, the block search module 30 acquires the latest valid-cluster number threshold (TH) stored in the internal memory of the threshold calculation module 31 (block 500). Moreover, the block search module 30 acquires the number of valid clusters (CN) from each active block (each block in which valid data is recorded) (block 501). In this case, the block search module 30 acquires the number of valid clusters (CN) in each active block from the block management module 23.

Upon retrieving a block for which the acquired number of valid clusters (CN) is zero, the block search module 30 provides the block management module 23 with a notification allowing this block to be released as a free block (unused standby block) (YES in block 502, 505). The controller 21 performs erase processing on the block. The block management module 23 registers the block subjected to the erase processing as a free block.

On the other hand, for a block for which the number of valid clusters (CN) is not zero, the block search module 30 compares the number of valid clusters (CN) with the valid-cluster number threshold (TH) (block 503). If the number of valid clusters (CN) is smaller than the threshold (TH), the block search module 30 registers the block with this number of valid clusters (CN) in a candidate list as a compaction target block (block 504).

The block search module 30 repeatedly performs a search processing on a predetermined range of active blocks to add blocks each with valid clusters the number (CN) of which is smaller than the threshold (TH), to the candidate list (block 506). In this case, the block search module 30 may select predetermined ones of the blocks each with valid clusters the number (CN) of which is smaller than the threshold (TH), as compaction target blocks in order of increasing number of valid clusters (CN).

The block list management module 32 manages the candidates for compaction target blocks and the blocks being subjected to the compaction processing using the respective list structures. Specifically, the block list management module 32 manages block IDs (identification information) of a group of blocks selected by the block search module 30, as candidates for compaction target blocks using the list structure.

The block list management module 32 includes, for example, three types of lists for the respective purposes as lists of candidates for compaction target blocks to manage the compaction target blocks. A first type of list is used for a normal compaction processing to manage the block IDs of the selected blocks. That is, in the normal compaction processing, the controller 22 checks the number of free blocks managed by the block management module 23, and if the number of free blocks is less than or equal to a specified value, allows the block search module 30 to start searching for compaction target blocks in order to avoid exhausting the free blocks.

Furthermore, a second type of list is used for compaction processing, intended to recover from errors. For example, the controller 22 periodically performs read checks, and for a block with error bits the number of which is greater than or equal to the specified value, uses the data in this block for processing of moving to another block for the purpose of retraction. This compaction processing is sometimes referred to as patrol refresh processing.

A third type of list is used for compaction processing, intended for were leveling for extending the life of the flash memory 11. The life of the flash memory 11 depends on the number of times blocks are erased and the time intervals between the erasures. Thus, the fatigues of the blocks need to be leveled. This compaction processing is started by a ware leveling module (not shown in the drawings) if the ware leveling is determined to be necessary.

The block list management module 32 prioritizes the candidates for compaction target blocks in each candidate list according to the corresponding purpose to generate a list of compaction target blocks during the compaction processing. The compaction processing will be specifically described below with reference to the flowchart in FIG. 6.

The cluster search module 33 checks the list managed by the block list management module 32 to determine whether each compaction target block comprises valid or invalid data in units of clusters, and searches each compaction target block for valid clusters comprising valid data (block 600).

The command list generation module 34 generates a set of request commands for the compaction processing (compaction request command) for valid clusters retrieved by the cluster search module 33 (block 601). The command list input module 35 inputs the compaction request commands received from the command list generation module 34 to the interface 20 (blocks 602 and 603). Thus, the compaction processing is performed on the flash memory 11 (block 604).

Here, the compaction request commands allow valid clusters to be read from the compaction target blocks and rewritten to another block. In the present embodiment, the command list generation module 34 issues all of the commands required for each page at a time; the page is the minimum writable unit. For the SSD of a multichannel configuration, the command list generation module 34 generates, for example, a set of commands corresponding to the number of clusters and which are indicative of "(the number of channels−the number of parity channels−the number of null blocks in the destination block)×the number of planes×the number of clusters per page".

After the compaction processing is complete, the controller 21 performs the erase processing on the compaction target blocks. The block management module 23 generates a list in which the blocks subjected to the erase processing are registered as free blocks (block 606).

As described above, according to the present embodiment, when compaction target blocks are searched for during execution of the compaction processing, low-density blocks each with a small number of valid clusters are determined based on the valid-bluster number threshold. The valid-cluster number threshold is updated to the latest value according to a variation in the margin of the memory capacity of the flash memory 11.

This search method according to the present embodiment enables compaction target blocks to be quickly and efficiently searched for, thus reducing the time required for the compaction processing. That is, when compaction target blocks are searched for, the valid-cluster number threshold is desirably minimized to allow blocks with as low a density as possible to be retrieved. On the other hand, the reduced margin of the flash memory 11 makes the search for candidates for compaction target blocks difficult. Conversely, presetting the valid-cluster number threshold to a sufficiently large value reduces the efficiency of the compaction processing.

Thus, the present embodiment updates the valid-cluster number threshold according to a variation in the margin to enable compaction target blocks to be quickly and efficiently searched for. Furthermore, the only dedicated memory area required for the processing of searching for compaction target blocks is the valid-cluster number threshold table provided in the threshold calculation module 31 and the memory area in which the threshold is stored. This enables the dedicated memory area to be minimized. In short, the present embodiment can perform effective processing of searching for compaction target blocks which processing is suitable for the usage (margin) of the flash memory, using the minimum required dedicated memory area. Therefore, the compaction processing can be efficiently achieved.

Second Embodiment

As shown in FIG. 7, a data storage apparatus according to the present embodiment is a solid-state drive (SSD) 1 comprising a flash memory 11 formed of a nonvolatile memory and serving as a data storage medium. The flash memory 11 comprises a plurality of memory chips 100 to 131 grouped in a matrix form with channels ch0 to ch7 corresponding to rows and banks 0 to 3 corresponding to columns. Moreover, each of the memory chips 100 to 131 is formed of a plurality of physical blocks. A physical block is a minimum physical storage area unit that is independently erasable in the flash memory 11. The SSD 1 internally manages a plurality of physical blocks as logical blocks. A logical block is a data erase unit for the SSD 1. In the present embodiment, a logical block is simply referred to as a block.

The SSD 1 includes an SSD controller 10 configured to control the flash memory 11. The SSD controller 10 comprises a host interface 13, a data buffer 3, a main controller 4, and a memory controller 5.

The host interface 13 controls the transfer of data, commands, and addresses between a host and the SSD 1. Here, the host is, for example, a computer including a Serial ATA (SATA) conformant interface. The data buffer 3 is, for example, a buffer memory formed of a dynamic random access memory (DRAM) or a static random access memory (SRAM). The host interface 13 stores data transferred by the host in the data buffer 3. Furthermore, the host interface 13 transfers commands and addresses transferred by the host to the main controller 4.

The data buffer 3 comprises a write buffer (WB) area 320 and a compaction buffer (CB) area 321. Write data (user data) transferred by the host is stored in the WB area 320. Write data (valid data) obtained during the compaction processing described below is stored in the CB area 321. The data buffer 3 may include an area in which a logical/physical address conversion table is stored.

The main controller 4 is formed of, for example, a microprocessor (MPU) to control the whole SSD controller 10. The main controller 4 includes a write/read controller 41, a block management module 42, and a compaction controller 43.

The write/read controller 41 controls read processing, and write processing, in accordance with a read command and a write command transferred by the host via the host interface 13. Furthermore, the write/read controller 41 performs control of write processing, such as control of the order of writes on the flash memory 11 in accordance with a write command for compaction processing transmitted by the compaction controller 43. The block management module 42 comprises a table for management of valid clusters in each block (each logical block herein) of the flash memory 11 and management information for use in managing free blocks (unused standby blocks).

The compaction controller 43 controls the compaction processing described below and performs processing of searching for compaction source blocks, processing of searching each block for valid clusters, processing of counting the number of valid clusters retrieved, processing of determining whether to suspend the processing of searching for valid clusters, and processing of generating a list of compaction commands. The compaction controller 43 comprises a valid-cluster search processing counter 431 and a valid-cluster cancelation determination module 432. The compaction command is a read command allowing a compaction read processing to be performed and a write command allowing a compaction write processing to be performed, as described below.

The memory controller 5 comprises a plurality of NAND controllers 50 to 57 for the respective channels ch0 to ch7 to perform read processing, or write processing, on the flash memory 6 in accordance with a command from the write/read controller 41. The NAND controllers 50 to 57 performs read processing, or write processing, on the corresponding ones of the memory chips 100 to 131 for each of channels ch0 to ch7 in parallel. In the present embodiment, the memory controller 5 performs read processing, for the compaction processing (compaction read processing) or write processing, for the compaction processing (compaction write processing) on the flash memory 6 in accordance with a command from the write/read controller 41 cooperating with the compaction controller 43.

[Compaction Processing]

First, the compaction processing will be described in brief with reference to FIG. 8.

As described above, in order to effectively utilize storage areas in blocks of the flash memory 11 which have a reduced density, the SSD 1 performs the compaction processing on each of the blocks.

As shown in FIG. 8, the compaction controller 43 performs processing of searching the flash memory 11 for compaction source blocks 80A and 80A (two logical blocks for convenience). The compaction source block refers to a compaction processing target block in which storage areas with valid data (latest data) stored therein have a reduced density.

The compaction controller 43 acquires active block list information from the block management module 42 and information for use in setting candidates for compaction source blocks, from a table for management of valid clusters in each block. In this case, low-density blocks with as few valid clusters as possible need to be searched for as compaction target blocks in order to effectively achieve the compaction processing.

Here, the clusters are minimum access units in which data is read from the flash memory 11. Each of the blocks 80A and 80B is formed of a plurality of logical pages (P0 to P2). Each of the logical pages comprises a plurality of clusters. Furthermore, the number of valid clusters (CN) is the amount of valid data in one block.

As shown in FIG. 8, the compaction controller 43 references the table for management of valid clusters to perform processing of searching the retrieved compaction source blocks 80A and 80B for valid clusters 21A and 21B. Log information is preset in the table to allow valid clusters to be distinguished from invalid clusters comprising invalid data.

The memory controller 5 performs compaction read processing of reading the valid clusters 81A and 81B from the compaction source blocks 80A and 80B in accordance with a command from the write/read controller 41 cooperating with the compaction controller 43. Moreover, the memory controller 5 performs compaction write processing of writing the valid clusters 81A and 81B read from the compaction source blocks 80A and 80B to a compaction destination block 80C.

The compaction destination block 80C is selected from a list of free blocks (writable empty blocks) managed by the block management module 42. The above-described compaction processing collects the valid clusters (valid data in units of clusters) 81A and 81B from the compaction source blocks 80A and 80B to rewrite the valid clusters 81A and 81B to the compaction destination block 80C. After the rewrite processing, erase processing is performed on the compaction source blocks 80A and 80B to allow the compaction source blocks 80A and 80B to be reutilized as free blocks.

Now, the compaction processing according to the present embodiment will be specifically described with reference to a flowchart in FIG. 9, FIGS. 10A and 10B, and FIG. 11.

First, when the number of sparse blocks with the density of storage areas with valid data reduced is increased as the write of user data to the flash memory 11 progresses in accordance with write requests from the host, the SSD 1 performs the compaction processing in order to acquire free blocks.

In this case, the compaction controller 43 starts the compaction processing at an appropriate timing to complete the compaction write processing. The write/read controller 41 cooperates with the compaction controller 43 in carrying out the compaction write processing between processing operations of writing user data which are executed in accordance with write commands from the host (these processing operations are hereinafter simply referred to as host write processing).

In this case, the compaction controller 43 issues a compaction command to the write/read controller 41 based on the progress rate of the compaction processing. The write/read controller 41 schedules write commands from the host in accordance with the compaction command from the compaction controller 43, and outputs a write command allowing the compaction write processing to be performed, to the memory controller 5. Given a pair of the host write processing and the compaction write processing, the progress rate of the compaction processing refers to the ratio of the number of logical pages intended for the host write processing to the number of logical pages intended for the compaction write processing (gear rate).

Specifically, the ratio of the number of logical pages (logical page addresses P0 to P2) refers to the ratio of the number of logical pages intended for the host write processing to be executed on a free block 40A shown in FIG. 10A (1 page) to the number of logical pages intended for the compaction write processing to be executed on a free block 40B shown in FIG. 10B (N pages; here N=2). The write/read controller 41 controls the order of writes to the flash memory 11 in both the host write processing and the compaction write processing so that the ratio of the number of logical pages in the host write processing to the number of logical pages in the compaction write processing is 1:2.

As shown in FIG. 11, the compaction controller 43 performs processing of searching for compaction source blocks 50A and 50B (two logical blocks for convenience). In this case, as described above, the compaction controller 43 acquires active block list information from the block management module 42 and information for use in setting candidates for compaction source blocks, from the table for management of valid clusters in each block.

Figure 9:
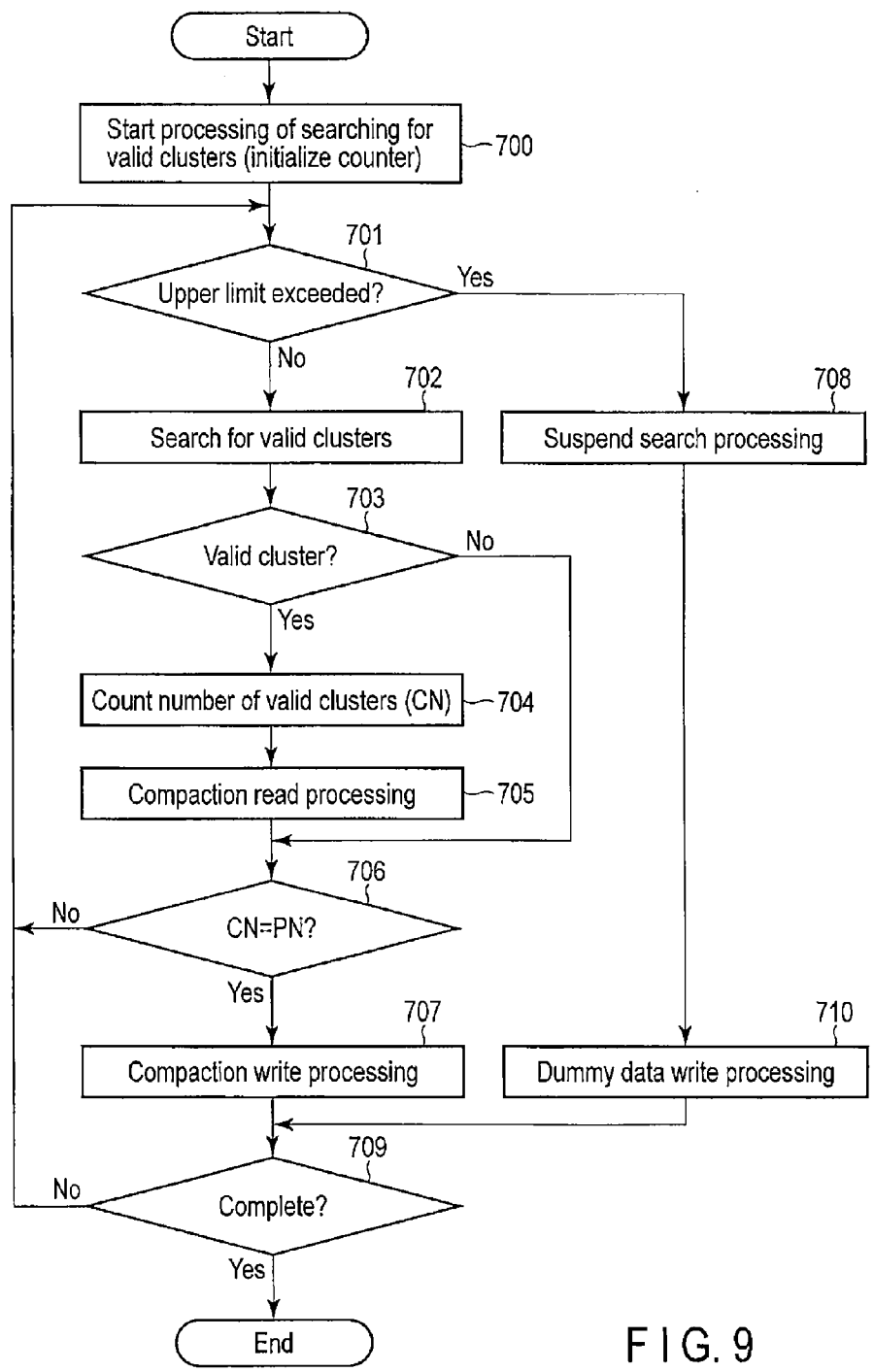
FIG. 9 is a flowchart illustrating the compaction processing according to the second embodiment.

Then, as shown in FIG. 9, the compaction controller 43 references the table for management of valid clusters to start processing of searching the retrieved compaction source blocks 50A and 50B for valid clusters 51A and 51B (block 700).

At the beginning of the search processing, the compaction controller 43 initializes the valid-cluster search processing counter 431, a counter for the processing of searching for valid clusters. The valid-cluster search processing counter 431 measures the throughput of the processing of searching for valid clusters for each compaction command issued. Specifically, the throughput of the search processing refers to the number of compaction source blocks, the number of logical pages, or time required for the search processing. In this case, the throughput of the search processing in terms of the number of logical pages refers to the number of valid clusters converted into the number of logical pages when the valid clusters are searched for. One logical page corresponds to, for example, two clusters. In this case, as described above, the compaction command is issued based on the progress rate of the compaction processing.

The valid-cluster cancellation determination module 432 of the compaction controller 43 compares the measured throughput of the search processing (counter value) with a preset upper limit value to determine whether or not the throughput of the search processing exceeds the upper limit value (block 701). Here, the upper limit value is set, for example, based on an upper limit time requirement for a command response to the host (write latency). The upper limit time for the command response is set based on the progress rate of the compaction processing as described above. The compaction controller 43 shifts to a normal compaction processing if the result of the determination by the valid-cluster cancellation module 432 does not exceed the upper limit value (NO in block 701).

As shown in FIG. 11, the compaction controller 43 references the table for management of valid clusters to searching the retrieved compaction source blocks 50A and 50B for the valid clusters 51A and 51B (block 702). As described above, log information is set in the table to allow valid clusters to be distinguished from invalid clusters comprising invalid data. The valid-cluster search processing counter 431 of the compaction controller 43 counts the number of valid clusters retrieved (CN) and holds the count value (CN), for example, in the internal register (YES in block 703, 304).

Then, the compaction controller 43 performs compaction read processing of reading the detected valid clusters 51A and 51B from the compaction source blocks 50A and 50B (block 705). Specifically, the compaction controller 43 generates a compaction command requesting the compaction read processing to be performed on the detected valid clusters 51A and 51B. The write/read controller 41 issues a read command from the compaction command and outputs the read command to the memory controller 5. Thus, the memory controller 5 reads the valid clusters 51A and 51B from the respective compaction source blocks 50A and 50B and stores the valid clusters 51A and 51B in a CB area 321 of the data buffer 3.

The compaction controller 43 repeats the processing ending with the compaction read processing until the number of valid clusters read by the compaction read processing (CN) is equal to the logical page unit (PN) for the compaction processing (CN=PN) (NO in block 706). When valid clusters for all the clusters contained in the logical page are stored in the CB area 321, the compaction controller 43 generates a compaction command requesting the compaction write processing to be performed (YES in block 706). The write/read controller 41 issues a write command from the compaction command for each logical page and outputs the write command to the memory controller 5. Thus, the memory controller 5 performs compaction write processing of writing the valid clusters for all the clusters contained in the logical page, which have been read from the CB area 321 of the data buffer 3, to the compaction destination block 50C (block 707). Specifically, as shown in FIG. 11, for example, the valid clusters for all the clusters contained in the logical page (logical page address P1) are written from the inside of the CB area 321 to the compaction destination block 50C.

On the other hand, if the valid-cluster cancellation determination module 432 determines that the throughput of the series of processing of searching for valid clusters including compaction read processing exceeds the upper limit value, the compaction controller 43 suspends the search processing (YES in block 701, 708). Here, as described above, the throughput of the search processing refers to, for example, the number of compaction source blocks, the number of logical pages, or the time required for the search processing.

When the search processing is suspended, if the number of the detected valid clusters is smaller than the number of all the clusters contained in the logical page, the compaction controller 43 generates a compaction command allowing dummy data (for example, all zeros) DD to be written (null padding) (block 710). In accordance with the compaction command, the write/read controller 41 writes the dummy data DD to areas 53 in the CB area 321 (logical page address P0) which correspond to the difference in number between the valid clusters and all the clusters contained in the logical page, as shown in FIG. 11. Thereafter, the write/read controller 41 issues a write command for each logical page and outputs the write command to the memory controller 5.

The memory controller 5 performs compaction write processing of writing the valid clusters for all the clusters contained in the logical page, which have been read from the CB area 321 of the data buffer 3, to the compaction destination block 50C (block 707). Specifically, as shown in FIG. 11, for example, the valid clusters and dummy data DD for all the clusters contained in the logical page (logical page address P0) are written from the inside of the CB area 321 to the compaction destination block 50C. The compaction controller 43 repeats the series of processing until the processing is complete for the number of logical pages to be subjected to the compaction processing (block 709).

As described above, the present embodiment can perform the compaction processing of collecting valid clusters from the compaction source blocks and rewriting the valid clusters to the compaction destination block. Thus, erasing the compaction source blocks enables an increase in the number of writable free blocks.

Moreover, if the processing of searching for valid clusters is being performed, the compaction processing according to the present embodiment suspends the search processing when, for example, the time required for the search processing exceeds the upper limit value. Since the upper limit value is set based on the upper limit time for the command response to the host, limiting the time required for the search processing ensures the upper limit time requirement (write latency). In this case, the suspension of the search processing may make the number of valid clusters read by the compaction read processing smaller than the number of all the clusters contained in a logical page. The present embodiment can reliably complete the compaction processing for rewriting valid clusters to the compaction destination block by writing an amount of dummy data DD corresponding to the difference in number between the read valid clusters and all the clusters contained in the logical page.

The present embodiment performs the search processing in units of valid clusters in searching the compaction source blocks for valid data. However, the search processing is not limited to this but may be performed in units of logical pages.

[Modification]

Figure 12:
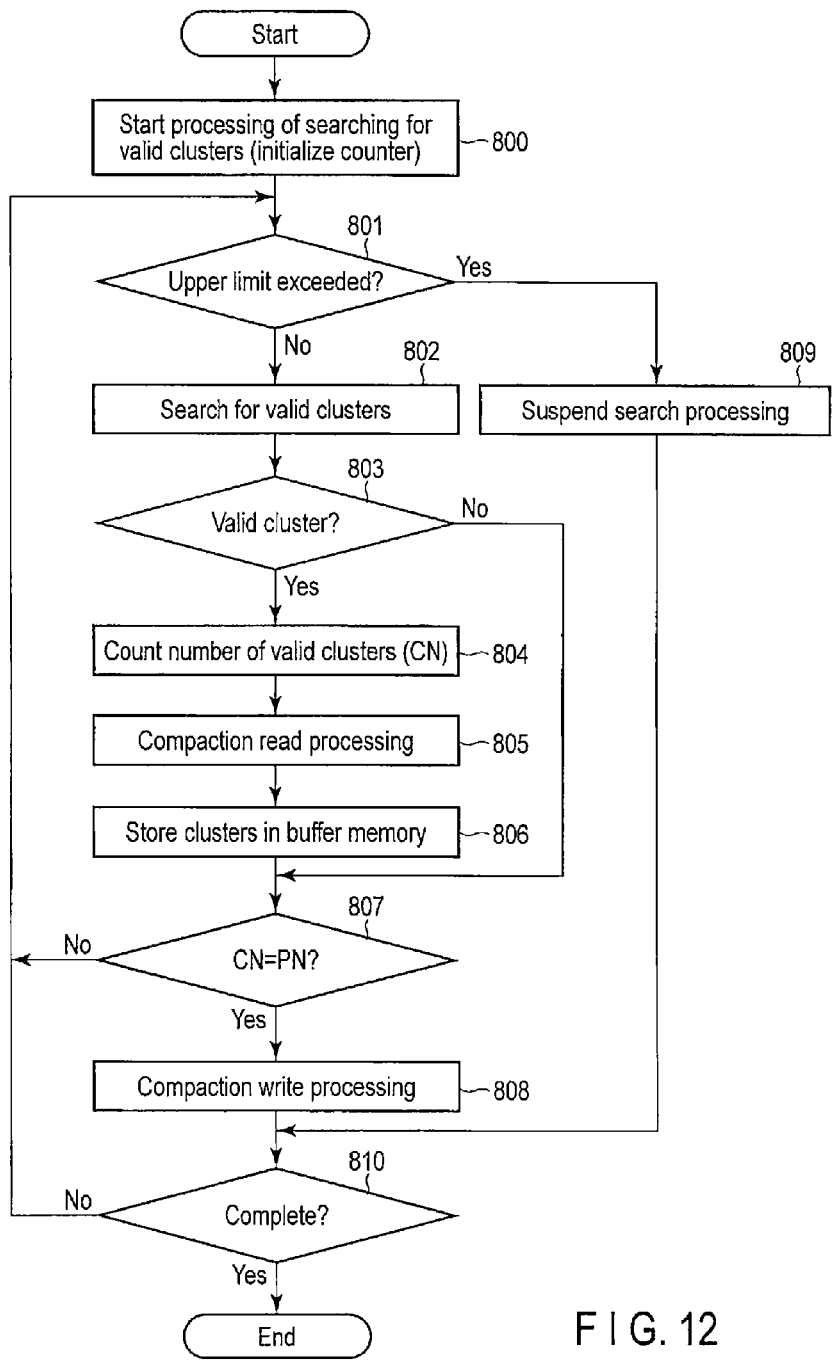
FIG. 12 is a flowchart illustrating compaction processing according to a modification of the second embodiment.

FIG. 12 is a flowchart illustrating compaction processing, according to a modification of the second embodiment. The configuration of the SSD 1 according to the modification is similar to that shown in FIG. 7 and will not be described in detail.

The modification is a processing method of waiting, if the search processing is suspended, until the number of valid clusters read by the compaction read processing and stored in the CB area 321 of the data buffer 3 becomes equal to the number of clusters contained in a logical page, without carrying out the compaction write processing including the processing of writing dummy data DD. This will be described below with reference to a flowchart in FIG. 12.

First, processing from block 800 to block 805 is similar to the processing from block 700 to block 705 shown in FIG. 9. That is, the compaction controller 43 starts search processing of searching retrieved compaction source blocks for valid clusters (block 800). The compaction controller 43 compares the measured throughput of the search processing (counter value) with a preset upper limit value to determine whether or not the throughput of the search processing exceeds the upper limit value (block 801). If the result of the determination is that the throughput does not exceed the upper limit value, the compaction controller 43 shifts to the normal compaction processing (NO in block 801).

The compaction controller 43 searches the retrieved compaction source blocks for valid clusters (block 802). The compaction controller 43 counts the number of valid clusters retrieved (CN) and holds the count value (CN), for example, in the internal register (YES in block 803, 804). Then, the compaction controller 43 performs compaction read processing of reading the detected valid clusters from the compaction source blocks (block 805).

That is, the memory controller 5 reads the valid clusters from each of the compaction source blocks and stores the valid clusters in the CB area 321 of the data buffer 3 (block 806). The compaction controller 43 repeats the processing ending with the compaction read processing until the number of valid clusters read by the compaction read processing (CN) is equal to the logical page unit (PN) for the compaction processing (CN=PN) (NO in block 807). When the valid clusters for all the clusters contained in the logical page are stored in the CB area 32, the compaction controller 43 generates a compaction command requesting the compaction write processing to be performed (YES in block 807). The memory controller 5 performs compaction write processing of writing the valid clusters for all the clusters contained in the logical page, which have been read from the CB area 321 of the data buffer 3, to the compaction destination block 50C (block 807).

On the other hand, if the throughput of the processing of searching for valid clusters exceeds the upper limit value, the compaction controller 43 suspends the search processing (YES in block 801, 809). Here, upon suspending the search processing, the compaction controller 43 avoids carrying out the compaction write processing. In this case, the SSD controller 10 performs host write processing instead. This ensures the data write performance of the SSD 1. The compaction controller 43 repeats the series of processing until processing of a number of logical pages to be subjected to the compaction processing is complete (step 810).

In this case, the compaction read processing accumulates the read valid clusters in the CB area 321 (block 806). When the valid clusters for all the clusters contained in the logical page are stored in the CB area 321, the compaction controller 43 generates a compaction command requesting the compaction write processing to be performed (YES in block 807). Thus, the memory controller 5 performs compaction write processing of writing the valid clusters for all the clusters contained in the logical page, which have been read from the CB area 321 of the data buffer 3, to the compaction destination block. Thus, if the search processing is suspended, the compaction processing for rewriting valid clusters to the compaction destination block can be reliably completed by waiting until the number of valid clusters read by the compaction read processing and stored in the CB area 321 of the data buffer 3 becomes equal to the number of clusters contained in a logical page.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus, comprising:
a flash memory configured to be able to erase data in units of blocks; and
a controller configured to control the flash memory and comprising a compaction processor configured to perform compaction processing, on the flash memory,
wherein the compaction processor comprises:
a threshold calculation module configured to calculate a threshold for the amount of valid data in each of the blocks as a condition for search for target blocks for the compaction processing and to update the threshold according to a variation in the number of available blocks in the flash memory to calculate a latest threshold; and
a search module configured to determine the blocks each with a relatively small amount of valid data and to search the blocks as the target blocks for the compaction processing.

2. The data storage apparatus of claim 1, wherein the threshold calculation module is configured to reference table information in which a margin indicative of a rate of the number of available blocks is associated with a valid data density for use in calculating the threshold to calculate the latest threshold from the valid data density according to the variation in the margin.

3. The data storage apparatus of claim 2, wherein the threshold calculation module is configured to comprise a memory in which the threshold is stored and to update the threshold stored in the memory according to the variation in the margin, and
the search module is configured to acquire the latest module stored in the memory from the threshold calculation module and to search for the target blocks for the compaction processing based on the latest threshold.

4. The data storage apparatus of claim 1, wherein the threshold calculation module is configured to calculate an average amount of valid data in an available block group in the flash memory and to calculate the latest threshold based on the average value.

5. The data storage apparatus of claim 1, wherein the search module is configured to select a predetermined number of blocks of the blocks for which the amount of valid data is smaller than the latest threshold, as the target blocks for the compaction processing in order of increasing amount of valid data.

6. A memory control apparatus comprising:
a read and write controller configured to control data read from a flash memory and data write to the flash memory; and
a compaction controller configured to control compaction processing, performed on the flash memory,
wherein the compaction controller comprises:
a search module configured to search compaction source blocks that are compaction processing targets for valid data;
a search suspension determination module configured to suspend a search processing by the search module if a throughput of the search processing by the search module exceeds an upper limit value;
a compaction read processing module configured to read the valid data retrieved by the search module from the compaction source blocks via the read and write controller; and
a compaction write processing module configured to write the valid data read by the compaction read processing module to a compaction destination block in units of a predetermined amount of data.

7. The memory control apparatus of claim 6, wherein the compaction controller comprises a data control processing module configured to perform a data control processing so as to satisfy the data amount unit if the search processing is suspended by the search suspension determination module and if the valid data to be written to the compaction destination block fails to satisfy the data amount unit.

8. The memory control apparatus of claim 7, wherein the data control processing module is configured to add dummy data sufficient to satisfy the data amount unit together with the valid data read from the compaction source blocks.

9. The memory control apparatus of claim 7, wherein the data control processing module is configured
to interrupt compaction write processing of carrying out write to the compaction destination block when the search processing is suspended by the search suspension determination module and
to accumulate the valid data read from the compaction source blocks in a buffer memory until the valid data satisfies the data amount unit.

10. The memory control apparatus of claim 6, wherein the throughput of the search processing is a number of compaction source blocks to be searched, a number of logical pages corresponding to the data amount unit of valid data to be searched, or time required for the search processing.

11. The memory control apparatus of claim 6, wherein the compaction controller is configured to perform the compaction processing based on a progress rate of processing comprising a pair of the compaction write processing and host write processing of writing data to the flash memory in accordance with a write request from a host.

12. The memory control apparatus of claim 11, wherein the upper limit value is set based on an upper limit time for a response to the write request from the host based on the progress rate.

13. The memory control apparatus of claim 6, wherein the valid data is in units of valid clusters, and
the data amount unit is in units of logical pages.

14. A data storage apparatus comprising:
a flash memory configured to use blocks as erase units;
a read and write controller configured to read data from the flash memory and to write data to the flash memory; and
a compaction controller configured to control compaction processing, performed on the flash memory,
wherein the compaction controller comprises:
a search module configured to search compaction source blocks that are compaction processing targets for valid data;
a search suspension determination module configured to suspend a search processing by the search module if a throughput of the search processing by the search module exceeds an upper limit value;

a compaction read processing module configured to read the valid data retrieved by the search module from the compaction source blocks via the read and write controller; and a compaction write processing module configured to write the valid data read by the compaction read processing module to a compaction destination block in units of a predetermined amount of data.

15. A method of performing compaction processing, on a flash memory using blocks as data erase units, the method being applied to a data storage apparatus with the flash memory, the method comprising:

searching compaction source blocks that are compaction processing targets for valid data if compaction processing, is performed on the flash memory;

suspending the search processing if a throughput of the search processing exceeds an upper limit value;

reading the valid data retrieved by the search processing from the compaction source blocks; and writing the valid data read by the compaction read processing to a compaction destination block in units of a predetermined amount of data.

* * * * *